United States Patent
An et al.

(10) Patent No.: US 11,343,716 B2
(45) Date of Patent: May 24, 2022

(54) BASE STATION FOR PROCESSING PLURALITY OF CELLS IN WIRELESS COMMUNICATION SYSTEM AND OPERATING METHOD THEREOF

(71) Applicant: Samsung Electronics Co., Ltd., Suwon-si (KR)

(72) Inventors: Chanho An, Suwon-si (KR); Seungjoo Maeng, Suwon-si (KR); Myonghee Park, Suwon-si (KR); Myoungwon Lee, Suwon-si (KR); Jinhyuk Lee, Suwon-si (KR); Seunghee Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/733,339

(22) PCT Filed: Jan. 2, 2019

(86) PCT No.: PCT/KR2019/000006
§ 371 (c)(1),
(2) Date: Jul. 1, 2020

(87) PCT Pub. No.: WO2019/135585
PCT Pub. Date: Jul. 11, 2019

(65) Prior Publication Data
US 2021/0120453 A1    Apr. 22, 2021

(30) Foreign Application Priority Data
Jan. 3, 2018    (KR) ........................ 10-2018-0000902

(51) Int. Cl.
*H04W 28/08*    (2009.01)
*H04W 88/08*    (2009.01)

(52) U.S. Cl.
CPC ....... *H04W 28/0808* (2020.05); *H04W 88/08* (2013.01)

(58) Field of Classification Search
CPC .......................... H04W 28/0808; H04W 88/08
See application file for complete search history.

(56) References Cited

U.S. PATENT DOCUMENTS 9,363,728 B2  6/2016  Choi et al.
9,712,296 B2  7/2017  Noh et al.
(Continued)

FOREIGN PATENT DOCUMENTS

KR    10-2014-0045887 A    4/2014
KR    10-2015-0012654 A    2/2015
(Continued)

OTHER PUBLICATIONS

English translation of Written Opinion of the International Searching Authority in connection with International Application No. PCT/KR2019/000006 dated Apr. 19, 2019, 5 pages.
(Continued)

*Primary Examiner* — Chi H Pham
*Assistant Examiner* — Weibin Huang

(57) ABSTRACT

Provided are a base station which processes a plurality of cells in a wireless communication system and an operation method of the base station. The operation method of the base station which processes a plurality of cells includes pooling a processing power of a first processor that processes a signal of a first cell and a processing power of a second processor that processes a signal of a second cell, and distributing the processing powers to the first processor and the second processor and processing, by the first processor and the second processor, the signal of the first cell and the signal of the second cell by using the distributed processing powers.

14 Claims, 9 Drawing Sheets

(56) References Cited

U.S. PATENT DOCUMENTS

| | | | |
|---|---|---|---|
| 9,838,184 B2 | 12/2017 | Kang et al. | |
| 10,050,681 B2 | 8/2018 | Kim et al. | |
| 10,231,255 B2 | 3/2019 | Huh et al. | |
| 2003/0069042 A1* | 4/2003 | Sato | H04W 88/08 |
| | | | 455/561 |
| 2008/0247365 A1 | 10/2008 | Carlsson | |
| 2014/0099954 A1* | 4/2014 | Choi | H04W 28/08 |
| | | | 455/436 |
| 2015/0050962 A1* | 2/2015 | Takashima | H04W 52/0206 |
| | | | 455/561 |
| 2016/0165628 A1* | 6/2016 | Huh | H04W 72/1268 |
| | | | 370/336 |
| 2017/0280356 A1* | 9/2017 | Wu | H04B 7/26 |
| 2018/0332604 A1* | 11/2018 | Lee | H04W 52/365 |

FOREIGN PATENT DOCUMENTS

| | | |
|---|---|---|
| KR | 10-2015-0075545 A | 7/2015 |
| KR | 10-2015-0140266 A | 12/2015 |
| KR | 10-2016-0036947 A | 4/2016 |
| KR | 10-2016-0147499 A | 12/2016 |
| KR | 10-2017-0074117 A | 6/2017 |

OTHER PUBLICATIONS

International Search Report and Written Opinion of the International Searching Authority in connection with International Application No. PCT/KR2019/000006 dated Apr. 19, 2019, 9 pages.

* cited by examiner

US 11,343,716 B2

BASE STATION FOR PROCESSING PLURALITY OF CELLS IN WIRELESS COMMUNICATION SYSTEM AND OPERATING METHOD THEREOF

CROSS-REFERENCE TO RELATED APPLICATIONS

This application is a 371 National Stage of International Application No. PCT/KR2019/000006, filed Jan. 2, 2019, which claims priority to Korean Patent Application No. 10-2018-0000902, filed Jan. 3, 2018, the disclosures of which are herein incorporated by reference in their entirety.

BACKGROUND

1. Field

The present disclosure relates to a base station for processing a plurality of cells and an operation method of the base station in a wireless communication system.

2. Description of Related Art

To meet ever-increasing demand with respect to wireless data traffic, a Long Term Evolution-Advanced (LTE-A) system after an LTE system has been commercialized. As wireless communication systems thereafter, an LTE-A Pro, $5^{th}$-Generation (5G), or new radio (NR) system is to be commercialized.

With the development of a wireless communication system, various techniques have been introduced to process increasing wireless data traffic. In applying the newly introduced techniques, the complexity of signal processing in a wireless communication system increases, increasing the complexity of hardware implementation for supporting signal processing. As the complexity of hardware implementation increases, costs for implementing hardware may also increase.

A method and apparatus for efficiently processing wireless data traffic in a wireless communication system is needed.

SUMMARY

According to an embodiment, an operation method of a base station which processes a plurality of cells includes pooling a processing power of a first processor that processes a signal of a first cell and a processing power of a second processor that processes a signal of a second cell, and distributing the processing powers to the first processor and the second processor and processing, by the first processor and the second processor, the signal of the first cell and the signal of the second cell by using the distributed processing powers.

According to an embodiment, a base station which processes a plurality of cells includes a first processor configured to process a signal of a first cell, a second processor configured to process a signal of a second cell, and a pooling processor configured to distribute processing powers to the first processor and the second processor by pooling the processing powers of the first processor and the second processor, in which the first processor and the second processor process the signal of the first cell and the signal of the second cell by using the processing powers distributed under control of the pooling processor.

According to an embodiment, a computer program product including a recording medium has stored therein a program for executing an operation method of a base station that processes a plurality of cells.

According to an embodiment, wireless data traffic may be efficiently processed.

DETAILED DESCRIPTION

Figure 1:
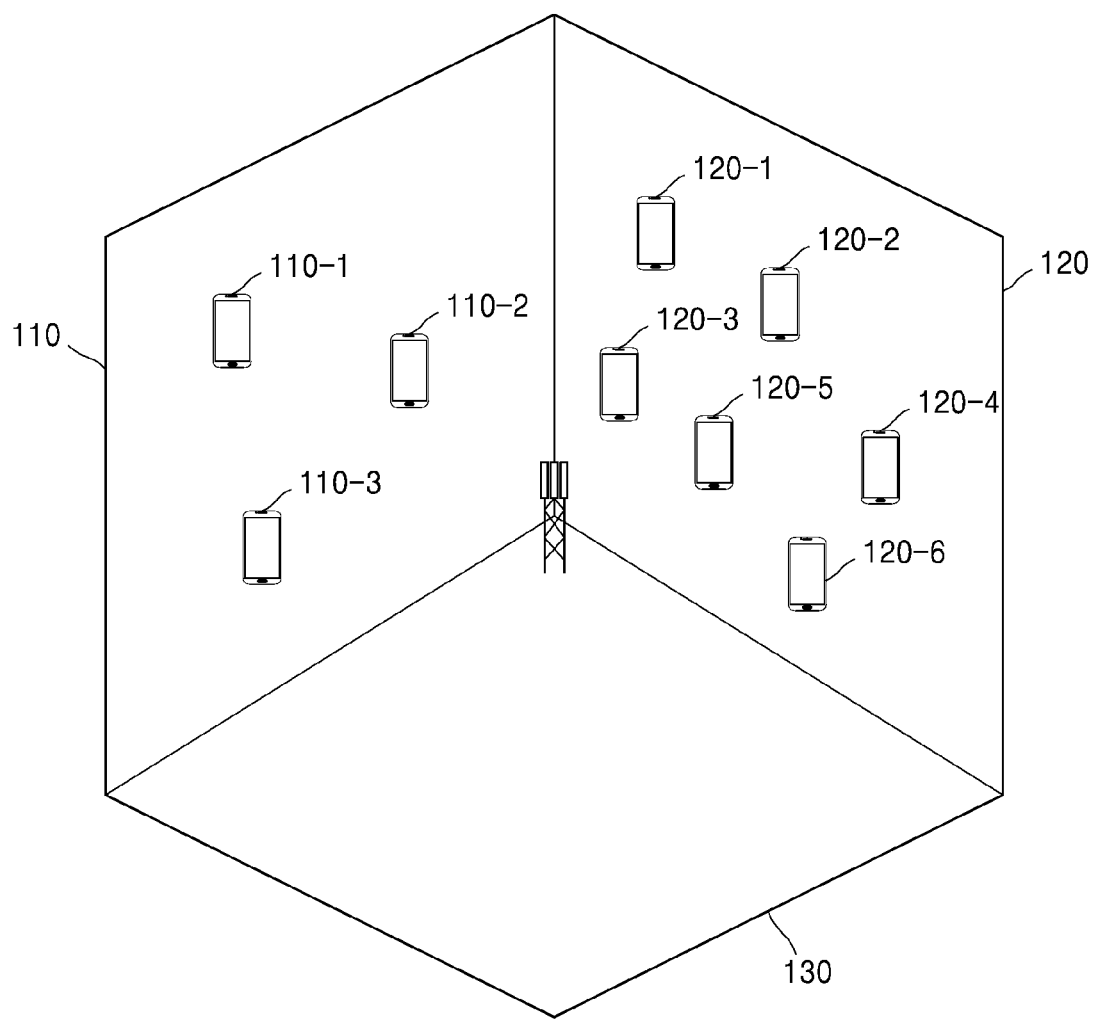
FIG. 1 is a diagram for describing a wireless communication system.

According to an embodiment, an operation method of a base station which processes a plurality of cells includes pooling a processing power of a first processor that processes a signal of a first cell and a processing power of a second processor that processes a signal of a second cell, and distributing the processing powers to the first processor and the second processor and processing, by the first processor and the second processor, the signal of the first cell and the signal of the second cell by using the distributed processing powers.

In an embodiment, the distributing of the processing powers to the first processor and the second processor may include obtaining load information of the first cell and the second cell, determining based on the load information of the first cell and the second cell whether to pool the processing powers of the first processor and the second processor, and distributing the processing powers to the first processor and the second processor and allocating loads, based on the load information of the first cell and the second cell, when determining to pool the processing powers of the first processor and the second processor.

In an embodiment, the distributing of the processing powers to the first processor and the second processor and the allocating of the loads may include calculating a processing complexity for each cell based on the loads allocated to the first cell and the second cell, determining whether a sum of processing complexities for respective cells is less than or equal to the pooled processing powers, and determining the loads allocated to the first cell and the second cell, when the sum of processing complexities for the respective cells is less than or equal to the pooled processing powers.

In an embodiment, the operation method may further include adjusting the loads allocated to the first cell and the second cell, when the sum of processing complexities for the respective cells is greater than the pooled processing powers.

In an embodiment, the adjusting of the loads allocated to the first cell and the second cell may include adjusting the loads such that they have the least possible effect on performance of the base station.

In an embodiment, the operation method may further include allocating a maximum processing power of each processor to each of the first processor and the second processor, when determining not to pool the processing powers of the first processor and the second processor.

In an embodiment, the loads may include terminals allocated to the first cell and the second cell, and the load information may include the number of terminals allocated to the first cell and the second cell.

In an embodiment, the processing, by the first processor and the second processor, of the signal of the first cell and the signal of the second cell by using the distributed processing powers may include performing, by the first processor and the second processor, scheduling with respect to the allocated terminals.

According to an embodiment, a base station which processes a plurality of cells includes a first processor configured to process a signal of a first cell, a second processor configured to process a signal of a second cell, and a pooling processor configured to distribute processing powers to the first processor and the second processor by pooling the processing powers of the first processor and the second processor, in which the first processor and the second processor process the signal of the first cell and the signal of the second cell by using the processing powers distributed under control of the pooling processor.

In an embodiment, the pooling processor may be further configured to obtain load information of the first cell and the second cell, determine based on the load information of the first cell and the second cell whether to pool the processing powers of the first processor and the second processor, and distribute the processing powers to the first processor and the second processor and allocating loads, based on the load information of the first cell and the second cell, when determining to pool the processing powers of the first processor and the second processor.

In an embodiment, the pooling processor may be further configured to calculate a processing complexity for each cell based on the loads allocated to the first cell and the second cell, determine whether a sum of processing complexities for respective cells is less than or equal to the pooled processing powers, and determine the loads allocated to the first cell and the second cell, when the sum of processing complexities for the respective cells is less than or equal to the pooled processing powers.

In an embodiment, the pooling processor may be further configured to adjust the loads allocated to the first cell and the second cell, when the sum of processing complexities for the respective cells is greater than the pooled processing powers.

In an embodiment, the pooling processor may be further configured to adjust the loads such that they have the least possible effect on performance of the base station.

In an embodiment, the pooling processor may be further configured to allocate a maximum processing power of each processor to each of the first processor and the second processor, when determining not to pool the processing powers of the first processor and the second processor.

In an embodiment, the loads may include terminals allocated to the first cell and the second cell, and the load information may include the number of terminals allocated to the first cell and the second cell.

In an embodiment, the first processor and the second processor may perform scheduling with respect to the allocated terminals.

According to an embodiment, a computer program product including a recording medium has stored therein a program for executing an operation method of a base station that processes a plurality of cells.

Hereinafter, embodiments of the disclosure will be described in detail with reference to the attached drawings to allow those of ordinary skill in the art to easily carry out the embodiments. However, the disclosure may be implemented in various forms, and are not limited to the embodiments described herein. To clearly describe the present disclosure, parts that are not associated with the description have been omitted from the drawings, and throughout the specification, identical reference numerals refer to identical parts.

Some embodiments of the present disclosure may be represented by block components and various process operations. All or some of such functional blocks may be implemented by various numbers of hardware and/or software components which perform specific functions. For example, functional blocks of the present disclosure may be implemented with one or more microprocessors or circuit elements for a specific function. The functional blocks of the present disclosure may also be implemented with various programming or scripting languages. Functional blocks may be implemented as an algorithm executed in one or more processors. Furthermore, the present disclosure may employ any number of techniques according to the related art for electronics configuration, signal processing and/or control, data processing and the like.

Connecting lines or connecting members between elements shown in the drawings are intended to merely illustrate functional connections and/or physical or circuit connections. In an actual device, connections between elements may be indicated by replaceable or added various functional connections, physical connections, or circuit connections.

The term used in the embodiments of the disclosure such as "unit" or "module" indicates a unit for processing at least one function or operation, and may be implemented in hardware, software, or in a combination of hardware and software. The term "unit" or "module" may be implemented by a program that is stored in an addressable storage medium and executable by a processor.

For example, the term "unit" or "module" may include software components, object-oriented software components, class components and task components, processes, functions, attributes, procedures, subroutines, segments of a program code, drivers, firmware, microcode, circuitry, data, databases, data structures, tables, arrays, and variables.

FIG. 1 is a diagram for describing a wireless communication system.

Referring to FIG. 1, one base station 10 may provide a wireless communication service in three cells 110, 120, and 130.

The base station 10 may be a device that connects a network with a terminal for a wireless communication service. The base station 10 may process a signal of a cell to provide a wireless communication service to a user. In the present disclosure, the base station may include any device capable of involving signal processing, such as a radio unit (RU), a digital unit (DU), a channel card, digital signal processing (DSP), etc.

The cells 110, 120, and 130 may have ranges allocated to allow the base station 10 to provide a wireless communication service. The base station 10 may divide one cell into several cells having smaller ranges to smoothly provide a wireless communication service. In the present disclosure, a cell may include a cell identified as a local sector and cells identified as a primary cell (PCell), a secondary cell (SCell), etc., in carrier aggregation. In FIG. 1, the three cells 110, 120, and 130 may be cells identified as local sectors.

The base station 10 may provide a wireless communication service by transmitting and receiving signals to and from user equipments 110-1, 110-2, 110-3, 120-1, 120-2, 120-3, 120-4, 120-5, and 120-6 included in the cells 110, 120, and 130 served by the base station 10. One or more user equipments may be included in the cells 110 and 120, or no user cell may be included in the cell 130.

As a means to provide a wireless communication service to multiple user equipments in one cell, there may be beamforming. Beamforming may mean transmission of data in an overlapping manner to a plurality of user equipments by using a plurality of antennas, e.g., array antennas. Beamforming may be performed based on a codebook or an inverse matrix of a channel matrix.

In a Long Term Evolution-Advanced (LTE-A) Pro system, through three-dimensional (3D) beamforming technique standardization using array antennas, the $3^{rd}$ Generation Partnership Project (3GPP) Rel-13 standards define a maximum of 16 transmission antennas (16Tx) and the 3GPP Rel-14 standards are in progress of standardization for supporting a maximum of 32 transmission antennas (32Tx). Main details of standardization extend the number of channel state information-reference signal (CSI-RS) ports and define a new codebook for 3D beamforming and CSI report-related matters, such as orthogonal demodulation reference signal (DMRS) extension for multi-user (MU)-multiple input multiple output (MIMO), sounding reference signal (SRS) capacity increase, etc.

Moreover, in a 5G or NR system, to achieve a high data transmission rate, implementation of a wireless communication service in an ultra-high frequency band millimeter-wave (mmWave) (e.g., a 60 GHz band) is being considered. In the 5G communication system, to alleviate propagation path loss and to increase a propagation distance in the ultra-high frequency band, beamforming techniques related to large-scale antennas such as massive MIMO, full dimensional (FD)-MIMO, etc., have been discussed as candidate techniques for improving transmission efficiency.

To perform such beamforming, the complexity of signal processing increases, and moreover, to perform beamforming advanced for improving transmission efficiency, the complexity of signal processing has no choice but to further increase.

While beamforming has been described as an example of the means for providing a wireless communication service to multiple user equipments in one cell, other various means may be used in which the complexity of signal processing may also increase to improve a data transmission rate.

Figure 2:
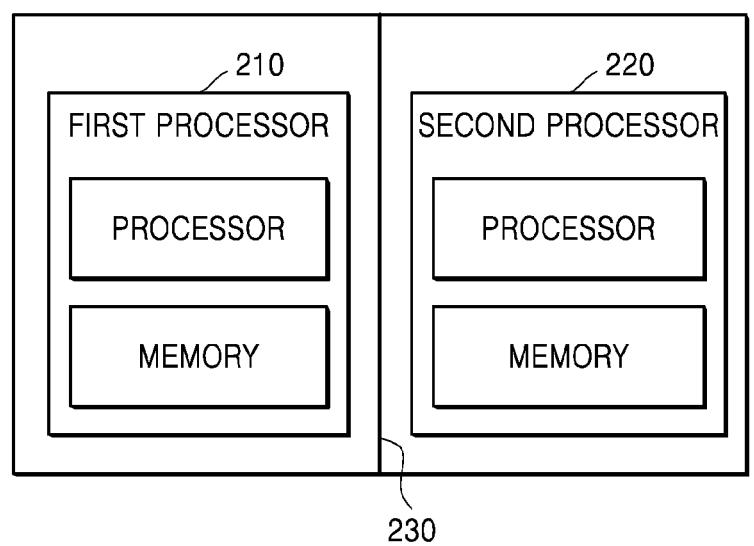
FIG. 2 is a diagram for describing a method, performed by a base station, of processing a plurality of cells.

FIG. 2 is a diagram for describing a method, performed by a base station, of processing a plurality of cells.

Referring to FIG. 2, a base station 10 may include a first processor 210 and a second processor 220. Herein, each of the first processor 210 and the second processor 220 is in charge of signal processing for one cell. Although two processors, i.e., the first processor 210 and the second processor 220 are illustrated in FIG. 2 through which the base station 10 processes two cells, this illustration is merely intended for convenience of a description, such that the base station 10 may process signals for three or more cells, and in this case, the base station 10 may include as many processors as cells. For example, as shown in FIG. 1, the base station 10 may process signals for three cells, and in this case, the base station 10 may include three processors.

Referring to FIG. 2, the first processor 210 may process a signal of a first cell and may include a processor and a memory required for signal processing. The second processor 220 may process a signal of a second cell and may include a processor and a memory required for signal processing. In this case, the processing power for the first processor 210 and the processing power of the second processor 220 may not be necessarily the same as each other.

In FIG. 2, the first processor 210 and the second processor 220 have fixed processing powers as indicated by 230 and may not be able to adjust or distribute their processing powers with respect to each other. That is, in the base station 10 shown in FIG. 2, for each of the first cell and the second cell, the processing power to process signals is fixed. Thus, a signal throughput possible for each cell is fixed, such that the maximum number of user equipments processible (allocable) at the same time is limited for each cell. In other words, since the processing powers of the first processor 210 and the second processor 220 are fixed as indicated by 230 in the base station 10 shown in FIG. 2, the number of user equipments processible at the same time is fixed based on the processing power of the processor.

As such, when the processing powers of the first processor 210 and the second processor 220 are fixed as indicated by 230, even though user equipments may be concentrated in the first cell and thus the first processor 210 uses the maximum level of the processing power, and no user equipment exists or a few user equipments exist and thus there is a margin in the processing power of the second processor 220, the second processor 220 having a margin in its processing power may not be able to help signal processing of the first processor 210 due to the fixed processing power of each processor. For example, when the user equipments 120-1, 120-2, 120-3, 120-4, 120-5, and 120-6 are concentrated in a cell 120 in FIG. 1, the processor in charge of the cell 120 has to use a high processing power. On the other hand, there is no user equipment in a cell 130, such that the processor in charge of the cell 130 does not use the processing power at all. Also in this case, the processing power of each processor is fixed, such that the processor in charge of the cell 130 having a margin in the processing power may not be able to help signal processing of the processor in charge of the cell 120.

As shown in FIG. 2, when the power of each processor is fixed, the processor having a margin in the processing power may not be able to help the processor that needs a high processing power, resulting inefficiency and thus a drop of a data transmission rate.

Figure 3:
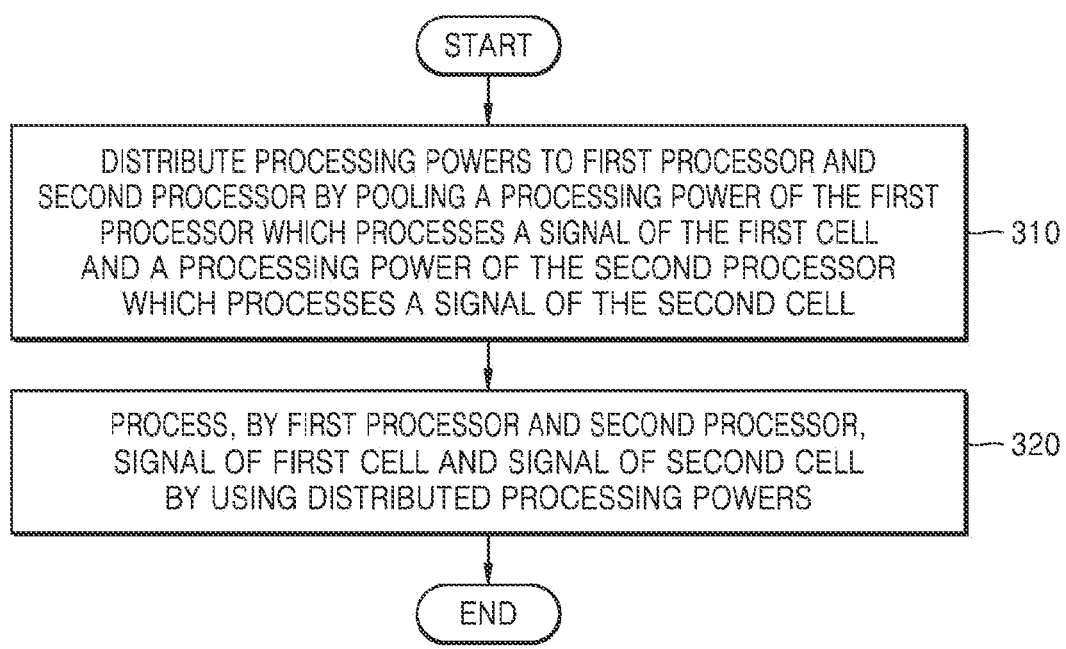
FIG. 3 is a flowchart illustrating an operation method of a base station, according to an embodiment.

FIG. 3 is a flowchart illustrating an operation method of a base station, according to an embodiment.

Referring to FIG. 3, in operation 310, a base station may pool a processing power of a first processor for processing a signal of a first cell and a processing power of a second processor for processing a signal of a second cell, and distribute the processing powers to the first processor and the second processor. That is, the base station may integrate the processing powers of the first processor and the second processor and distribute processing powers to a required processor. According to an embodiment, the base station may distribute processing powers based on a cell-specific load, a maximum number of allocated user equipments, a throughput, proportional fairness (PF), etc.

According to an embodiment, the processing powers of the first processor and the second processor may not be necessarily the same as each other. That is, the processing power of the first processor may be greater than the processing power of the second processor, or the processing power of the second processor may be greater than the processing power of the first processor. According to an embodiment, even when the base station is configured such that a processor having a high processing power is in charge of a cell in which users terminals are expected to be concentrated and a processor having a low processing power is in charge of a cell expected to be roomy, the processing powers of the first processor and the second processor may be pooled and used when necessary. Thus, even when a base station 1200 performs pooling, a cell and a processor in charge of the cell may be freely configured.

Thereafter, in operation 320, the base station may process a signal of a first cell and a signal of a second cell by using distributed processing powers through a first processor and a second processor. According to an embodiment, the first processor and the second processor may perform scheduling with respect to an allocated terminal.

As described above, in an environment where the base station actually operates, a load may be often different from cell to cell. For example, when the user equipments 120-1, 120-2, 120-3, 120-4, 120-5, and 120-6 are concentrated in the cell 120 in FIG. 1, the processor in charge of the cell 120 is allocated a load and thus has to use a high processing power. On the other hand, there is no user equipment in a cell 130, such that the processor in charge of the cell 130 does not use the processing power at all because of having no load. According to an embodiment, in this case, a high processing power is distributed to a processor allocated a large load, thus efficiently processing wireless data traffic.

According to an embodiment, when actual traffic occurs after distribution of the processing powers to the first processor and the second processor, traffic may be allocated to the respective processors based on a processing power distribution result. For example, when a part of the processing power of the second processor is distributed to the first processor, traffic to be processed using the processing power of the second processor out of traffic of the first cell served by the first processor may be allocated to the second processor such that the traffic may be processed by the second processor.

Although it is illustrated in FIG. 3 that the base station processes two cells, i.e., the first cell and the second cell by using two processors, i.e., the first processor and the second processor, this illustration is merely intended for convenience of a description, such that the base station 1200 may process signals for three or more cells, and in this case, the base station may include as many processors as cells. For example, as shown in FIG. 1, the base station 1200 may process signals for three cells, and in this case, the base station 1200 may include three processors.

Figure 4:
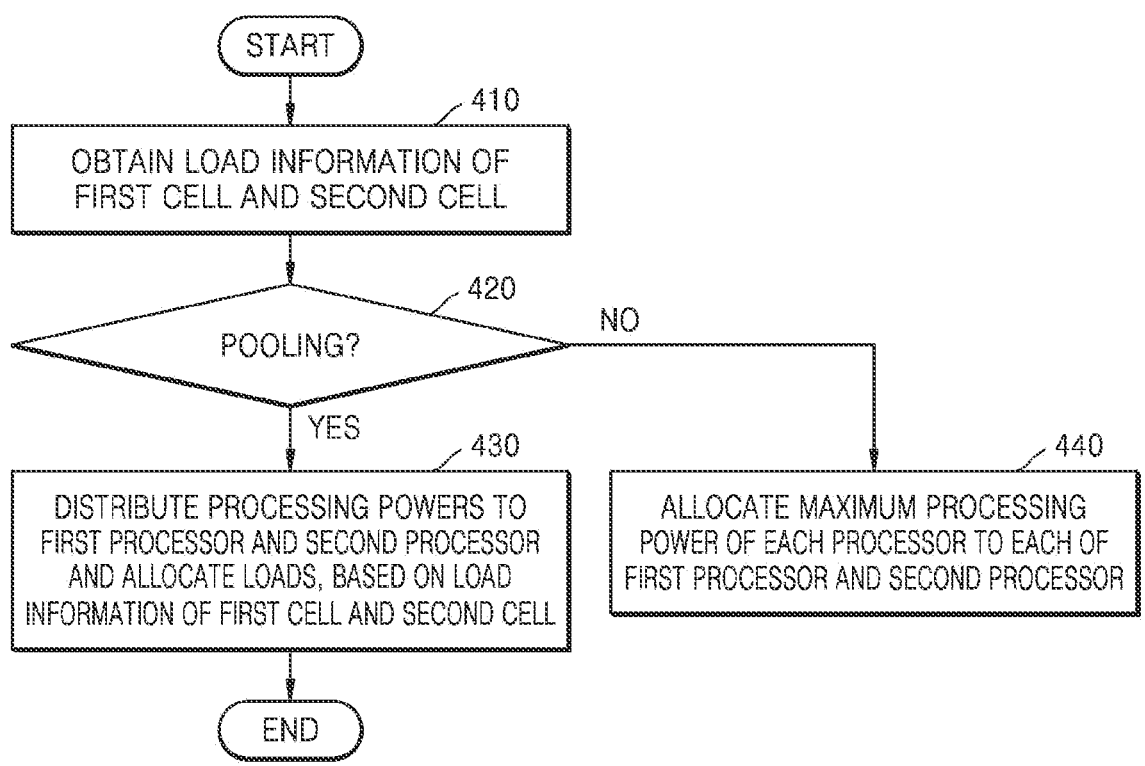
FIG. 4 is a flowchart illustrating a method of distributing processing powers to a first processor and a second processor, according to an embodiment.

FIG. 4 is a flowchart illustrating a method of distributing processing powers to a first processor and a second processor, according to an embodiment.

In FIG. 4, operation 310 of FIG. 3, i.e., a process of distributing processing powers to the first processor and the second processor by pooling the processing powers of the first processor and the second processor is specified.

In operation 410, the base station may obtain load information of the first cell and the second cell. Herein, the load may include terminals allocated to the first cell and the second cell, and the load information may include the number of terminals allocated to the first cell and the number of terminals allocated to the second cell.

In operation 420, the base station may determine based on the load information of the first cell and the second cell whether to pool processing powers of the first processor and the second processor. The base station may determine whether to perform pooling in operation 420. This is because the base station supporting pooling does not need to pool and distribute the processing powers to the first processor and the second processor even in a case where pooling is not required. For example, in case that as many user equipments as efficiently processible by the first processor and the second processor are located in the first cell and the second cell, the first processor and the second processor may efficiently process wireless data traffic even when processing signals of the first cell and the second cell without needing to perform pooling.

When the base station determines to pool the processing powers of the first processor and the second processor in operation 420, the base station may distribute the processing powers to the first processor and the second processor and allocate loads, based on the load information of the first cell and the second cell in operation 430.

When the base station determines not to pool the processing powers of the first processor and the second processor in operation 420, the base station may allocate a maximum processing power of each processor to each of the first processor and the second processor in operation 440. The first processor and the second processor may process the signals of the first cell and the second cell managed by the first processor and the second processor within their allocated maximum processing powers.

Hereinbelow, referring to FIGS. 5 and 6, a method of distributing processing powers to the first processor and the second processor will be described.

Figure 5:
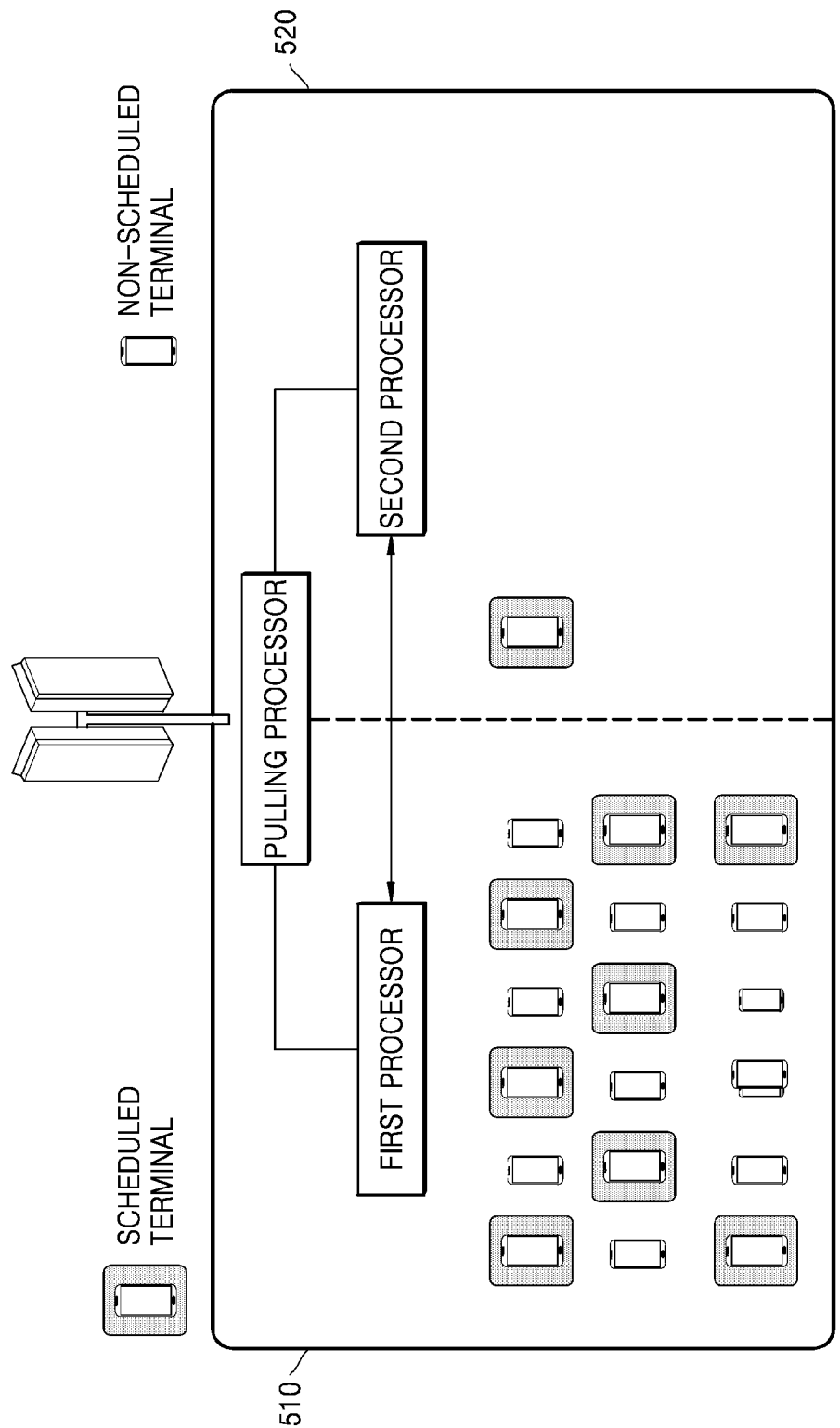
FIGS. 5 and 6 are diagrams for describing a method of distributing processing powers to a first processor and a second processor, according to an embodiment.
Figure 6:
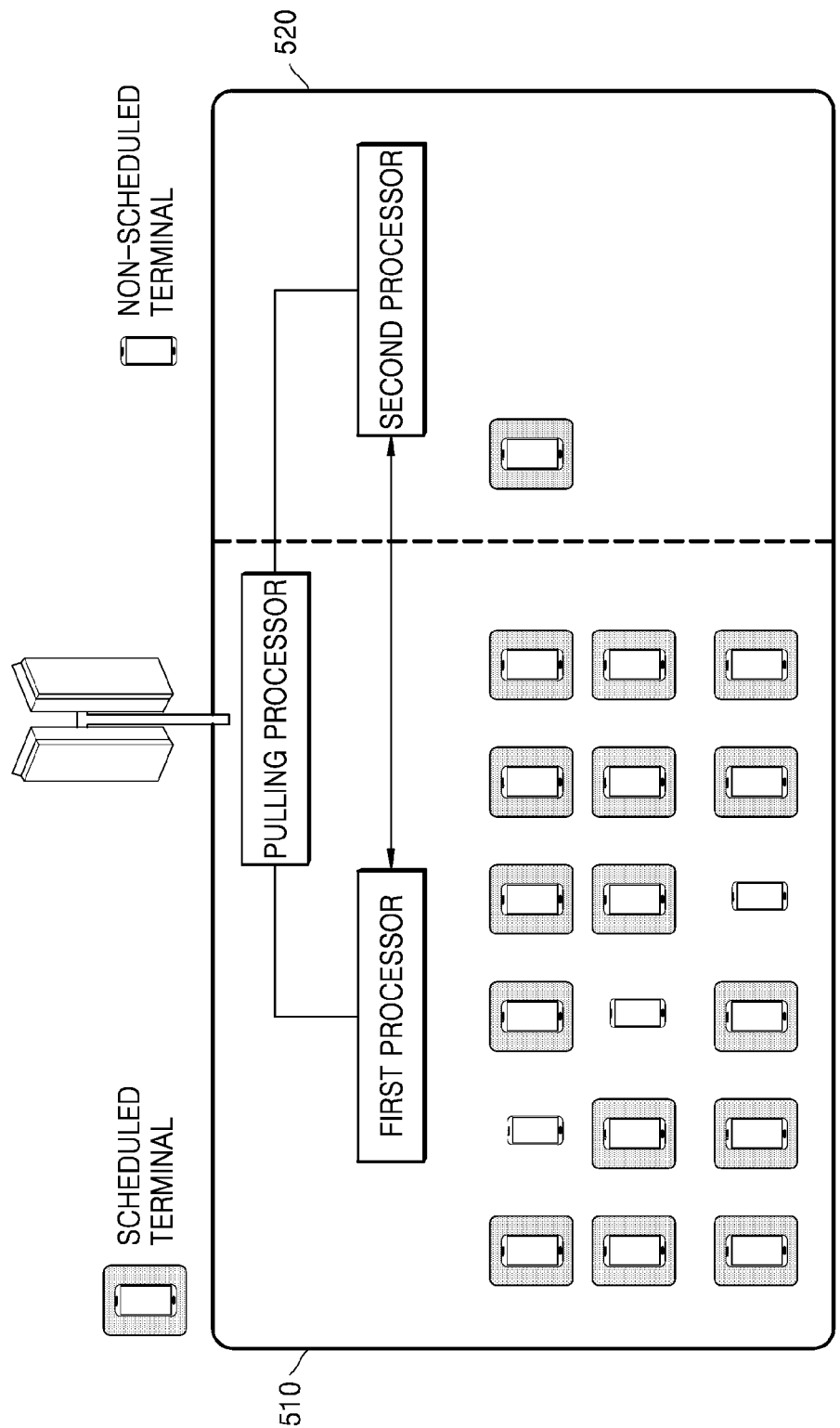

FIGS. 5 and 6 are diagrams for describing a method of distributing processing powers to a first processor and a second processor, according to an embodiment.

Referring to FIG. 5, the first processor may process a signal of a first cell 510 and the second processor may process a signal of a second cell 520. Each of the first cell 510 and the second cell 520 is assumed to schedule a maximum of 8 user equipments. There are a total of 18 candidate user equipments (UEs) in the first cell 510. However, one cell is assumed to schedule a maximum of 8 user equipments, such that 8 user equipments among a total of 18 candidate user equipments are scheduled. In the second cell 520, a total of 1 candidate user equipment exists and is scheduled.

As a result, the first processor performs signal processing with respect to a maximum of 8 user terminals to be scheduled in the first cell, but the second processor may process a signal for one user equipment without performing signal processing with respect to maximum user equipments due to a small number of candidate user equipments. When maximum user equipments are scheduled in the first cell and the second cell, i.e., 8 user equipments are scheduled and thus a total of 16 user terminals are scheduled in each cell, and this number of user terminals is assumed to be a peak number of user terminals processible by the base station, then the base station uses only 56.25% (9/16) of peak performance as shown in FIG. 5.

In comparison with this, FIG. 6 shows a process of distributing the processing powers to the first processor and the second processor by pooling the processing powers of the first processor and the second processor. Referring to FIG. 6, the base station has pooled the processing powers of the first processor and the second processor, in which a total of 1 candidate user equipment exists in the second cell 520 and is scheduled, such that the base station distributes the processing power necessary for signal processing for one user equipment and distributes the remaining processing power to the first processor. Thus, the first processor may receive the remaining processing power for the second processor except for the processing power necessary for signal processing with respect to one user equipment, thus scheduling a total of 15 user equipments among a total of 18 candidate user equipments of the first cell. More specifically, the original processing power of the first processor, which is necessary for signal processing with respect to 8 user equipments, and the processing power of the second processor, which is necessary for signal processing with respect to 7 user equipments except for the processing power necessary for signal processing with respect to 1 user equipment, may be distributed to the first processor which may then schedule a total of 15 user equipments. In this case, a total of 16 user equipments are scheduled for the base station which may use a peak performance of 100%. Referring to [Table 1], performance improvement corresponding to distribution of the processing powers to the first processor and the second processor will be described.

TABLE 1

|  | + | x | / | sqrt | Complexity (1:1:1:1) |
|---|---|---|---|---|---|
| 2 × 2 Matrix Inversion | 574 | 771 | 2 | 2 | 1,349 |
| 3 × 3 Matrix Inversion | 1,441 | 1,741 | 3 | 3 | 3,188 |
| 4 × 4 Matrix Inversion | 2,700 | 3,106 | 4 | 4 | 5,814 |
| 5 × 5 Matrix Inversion | 4,355 | 4,870 | 5 | 5 | 9,235 |
| 6 × 6 Matrix Inversion | 6,410 | 7,037 | 6 | 6 | 13,459 |
| 7 × 7 Matrix Inversion | 8,869 | 9,611 | 7 | 7 | 18,494 |
| 8 × 8 Matrix Inversion | 11,736 | 12,596 | 8 | 8 | 24,348 |
| 9 × 9 Matrix Inversion | 15,015 | 15,996 | 9 | 9 | 31,029 |
| 10 × 10 Matrix Inversion | 18,710 | 19,815 | 10 | 10 | 38,545 |
| 11 × 11 Matrix Inversion | 22,825 | 24,057 | 11 | 11 | 46,904 |
| 12 × 12 Matrix Inversion | 27,364 | 28,726 | 12 | 12 | 56,114 |
| 13 × 13 Matrix Inversion | 32,331 | 33,826 | 13 | 13 | 66,183 |

[Table 1] assumes that in a frequency division (FD)-multiple input multiple output (MIMO) operation based on a channel inverse matrix, user terminals are dispersed in a strong electric field, there is no correlation between terminals, one base station processes signals of two cells, one cell is capable of scheduling a maximum of 8 user equipments, and 12 or more user equipments exist in the first cell. From [Table 1], a change in the number of terminals scheduled with a change in the number of user equipments in the second cell may be seen in this case.

As can be seen from [Table 1], until the number of terminals included in the second cell is 8 being a maximum number of user equipments that may be scheduled by the second cell, distribution of the processing power according to an embodiment is more efficient than a related technique.

Figure 7:
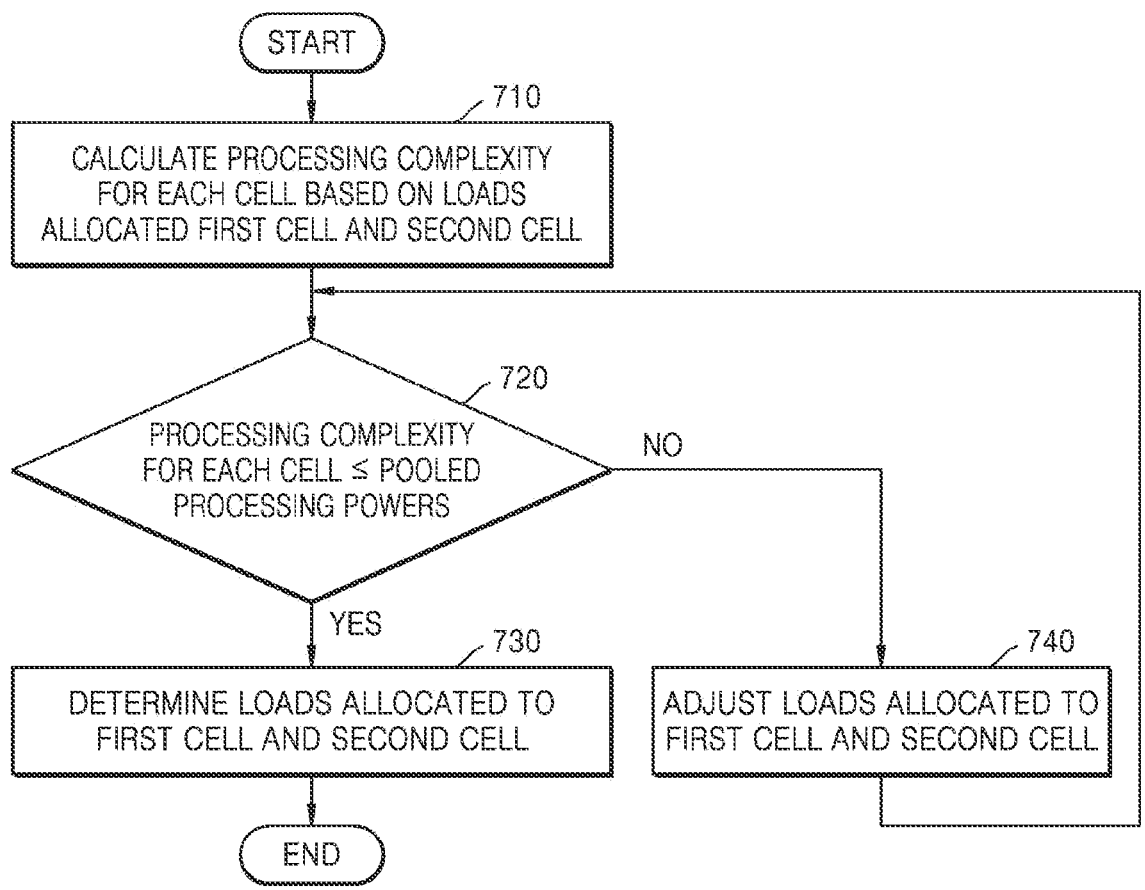
FIG. 7 is a flowchart illustrating a method of allocating loads to a first processor and a second processor, according to an embodiment.

FIG. 7 is a flowchart illustrating a method of allocating loads to a first processor and a second processor, according to an embodiment.

In operation 710, the base station may calculate a processing complexity for each cell based on loads allocated to the first cell and the second cell.

In operation 720, the base station may determine whether a sum of processing complexities for respective cells is less than or equal to the pooled processing powers. Operation 720 may be expressed as below.

Complexity(Cell 1)+Complexity(Cell 2)+ . . . +Complexity(Cell *N*)<Complexity(*BS*) [Equation 1]

Even when the base station pools the processing powers of the first processor and the second processor, a sum of processing complexities of the respective processors should be less than a sum of processing complexities processible by the entire base station.

When a sum of processing complexities for the respective cells is less than or equal to the pooled processing powers in operation 720, the base station may determine loads allocated to the first cell and the second cell in operation 730.

When a sum of processing complexities for the respective cells is greater than the pooled processing powers in operation 720, the base station may adjust the loads allocated to the first cell and the second cell in operation 740. In an embodiment, the base station may adjust the loads such that they have the least possible effect on performance of the base station.

More specifically, using beamforming as an example, generally, in codebook-based beamforming, complexity increases in proportional to the number of allocated user equipments. Thus, when one base station controls N cells and a signal may be transmitted to a maximum number of K user equipments through beamforming for each cell, in an embodiment, an increase in complexity may not be large even a maximum number of N×K user equipments are allocated to the base station.

However, in beamforming based on a channel inverse matrix, complexity increases in proportional to an exponential complexity of the number of allocated user equipments. This will be described below with reference to [Table 2].

TABLE 2

| Number of UEs Included in First Cell | Number of UEs Included in Second Cell | Number of Scheduled Terminals | |
|---|---|---|---|
| | | Related Art | Embodiment |
| 12 UE | 2 UE | 10 | 14 |
| 12 UE | 3 UE | 11 | 15 |
| 12 UE | 4 UE | 12 | 16 |
| 12 UE | 5 UE | 13 | 16 |
| 12 UE | 6 UE | 14 | 16 |
| 12 UE | 7 UE | 15 | 16 |
| 12 UE | 8 UE | 16 | 16 |
| 12 UE | 9 UE | 16 | 16 |
| 12 UE | 10 UE | 16 | 16 |
| 12 UE | 11 UE | 16 | 16 |
| 12 UE | 12 UE | 16 | 16 |

[Table 2] shows the amount of computation of addition, subtraction, multiplication, division, and a square root needed according to a matrix size when an inverse matrix is calculated according to a Cholesky scheme (+: addition, subtraction, ×: multiplication, /: division, sqrt: square root). Table 1 shows complexity assuming the same complexity necessary for processing of each operation (the complexity necessary for processing of an operation may be applied with a weight according to characteristics of software (SW)/hardware (HW), etc.). Referring to Table 1, assuming that each operation is performed once (1:1:1:1), it may be seen that complexity increases in proportional to an exponential complexity of the number of allocated user equipments. Thus, when one base station controls N cells and a signal may be transmitted to a maximum number of K user equipments through beamforming for each cell, complexity largely increases once a maximum of N×K user equipments are allocated to the base station. In this case, when implementation is required with the same complexity, a maximum number of allocable user equipments may decrease. Thus, in such a case, the number of user equipments allocated for each cell needs to be adjusted such that the processing powers pooled by the base station are not exceeded.

Figure 8:
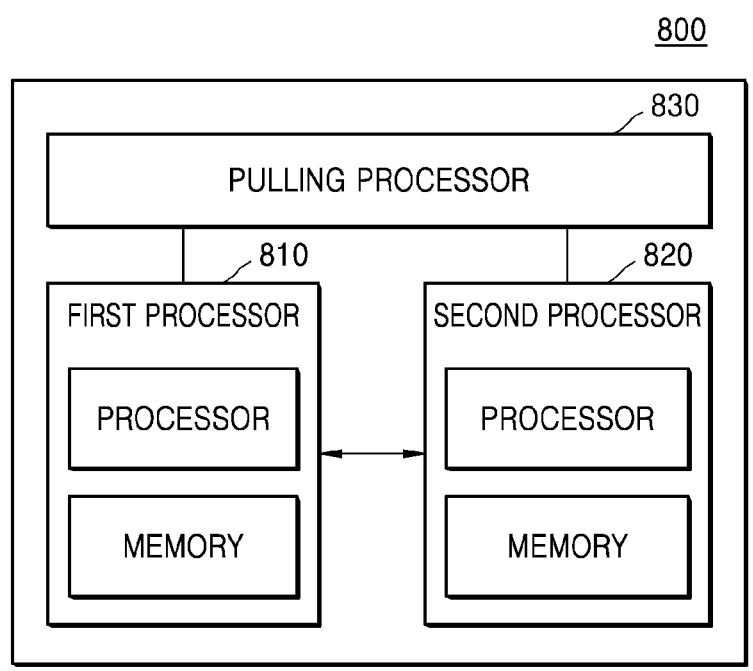
FIG. 8 is a diagram illustrating a base station that processes a plurality of cells, according to an embodiment.

FIG. 8 is a diagram illustrating a base station that processes a plurality of cells, according to an embodiment.

Referring to FIG. 8, a base station 30 according to an embodiment may include a first processor 810, a second processor 820, and a pooling processor 830.

The first processor 810 may process a signal of a second cell and may include a processor and a memory required for signal processing. The second processor 820 may process a signal of a second cell and may include a processor and a memory required for signal processing. The first processor 810 and the second processor 820 may process the signal of the first cell and the signal of the second cell by using the distributed processing power, under control of the pooling processor 830. In an embodiment, the first processor 810 and the second processor 820 may perform scheduling with respect to an allocated terminal.

The pooling processor 830 may pool the processing powers of the first processor 810 and the second processor 820 and distribute the processing powers to the first processor 810 and the second processor 820. That is, the pooling processor 820 may integrate the processing powers of the first processor 810 and the second processor 820 and allocate the processing power to a processor requesting the processing power. In an embodiment, the pooling processor 830 may distribute processing powers based on a cell-specific load, a maximum number of allocated user equipments, a throughput, PF, etc.

In an embodiment, the pooling processor 830 may obtain load information of the first cell and the second cell and determine whether to pool the processing powers of the first processor 810 and the second processor 820 based on the load information of the first cell and the second cell. Herein, the load may include terminals allocated to the first cell and the second cell, and the load information may include the number of terminals allocated to the first cell and the number of terminals allocated to the second cell. When the pooling processor 830 determines to pool the processing powers of the first processor 810 and the second processor 820, the pooling processor 830 may distribute the processing powers to the first processor 810 and the second processor 820 and allocate loads. In an embodiment, the pooling processor 830 may distribute a larger processing power to a processor needing a processing power. In an embodiment, when the pooling processor 830 determines not to pool the processing powers of the first processor 810 and the second processor 820, the pooling processor 830 may allocate a maximum processing power of each processor to each of the first processor 810 and the second processor 820.

As described above, in an environment where the base station actually operates, a load may be often different from cell to cell. For example, when the user equipments 80-1, 80-2, 80-3, 80-4, 80-5, and 80-6 are concentrated in the cell 80 in FIG. 1, the processor in charge of the cell 80 is allocated a load and thus has to use a high processing power. On the other hand, there is no user equipment in a cell 130, such that the processor in charge of the cell 130 does not use the processing power at all because of having no load. According to an embodiment, in this case, a high processing power is distributed to a processor allocated a large load, thus efficiently processing wireless data traffic.

In an embodiment, the processing power for the first processor 810 and the processing power of the second processor 820 may not be necessarily the same as each other. That is, the processing power of the first processor 810 may be greater than the processing power of the second processor 820, or the processing power of the second processor 820 may be greater than the processing power of the first processor 810. According to an embodiment, even when a base station 800 is configured such that a processor having a high processing power is in charge of a cell in which users terminals are expected to be concentrated and a processor having a low processing power is in charge of a cell expected to be roomy, the processing powers of the first processor and the second processor may be pooled and used when necessary. Thus, even when the base station 800 performs pooling, a cell and a processor in charge of the cell may be freely configured.

In an embodiment, when actual traffic occurs after distribution of the processing powers to the first processor 810 and the second processor 820, traffic may be allocated to the respective processors based on a processing power distribution result. For example, when a part of the processing power of the second processor 820 is distributed to the first processor, traffic to be processed using the processing power of the second processor 820 out of traffic of the first cell served by the first processor may be allocated to the second processor 820 such that the traffic may be processed by the second processor 820.

In an embodiment, the pooling processor 830 may calculate a processing complexity for each cell based on loads to the first cell and the second cell and determine whether a sum of processing complexities for the respective cells is less than or equal to pooled processing powers. Even when the pooling processor 830 pools the processing powers of the first processor 810 and the second processor 820, a sum of processing complexities of the respective processors should be less than a sum of processing complexities processible by the entire base station 800. When a sum of processing complexities for the respective cells is less than or equal to the pooled processing powers, the pooling processor 830 may determine loads allocated to the first cell and the second cell. Alternatively, when a sum of processing complexities for the respective cells is greater than the pooled processing powers, the pooling processor 830 may adjust loads allocated to the first cell and the second cell. In this case, the pooling processor 830 may adjust the loads such that they have the least possible effect on performance of the base station.

In addition, although not shown in FIG. 8, the base station may further include a transceiver (not shown). The transceiver (not shown) may transmit and receive a signal to and from a user equipment. The signal may include control information and data. To this end, the transceiver (not shown) may include an RF transmitter that up-converts and amplifies a frequency of a transmission signal and an RF signal that low-noise-amplifies a received signal and down-converts a frequency.

Although two processors, i.e., the first processor 810 and the second processor 820 are illustrated in FIG. 8 through which the base station 800 processes two cells, i.e., the first cell and the second cell, this illustration is merely intended for convenience of a description, such that the base station 800 may process signals for three or more cells, and in this case, the base station 10 may include as many processors as cells. For example, as shown in FIG. 1, the base station 800 may process signals for three cells, and in this case, the base station 800 may include three processors.

Figure 9:
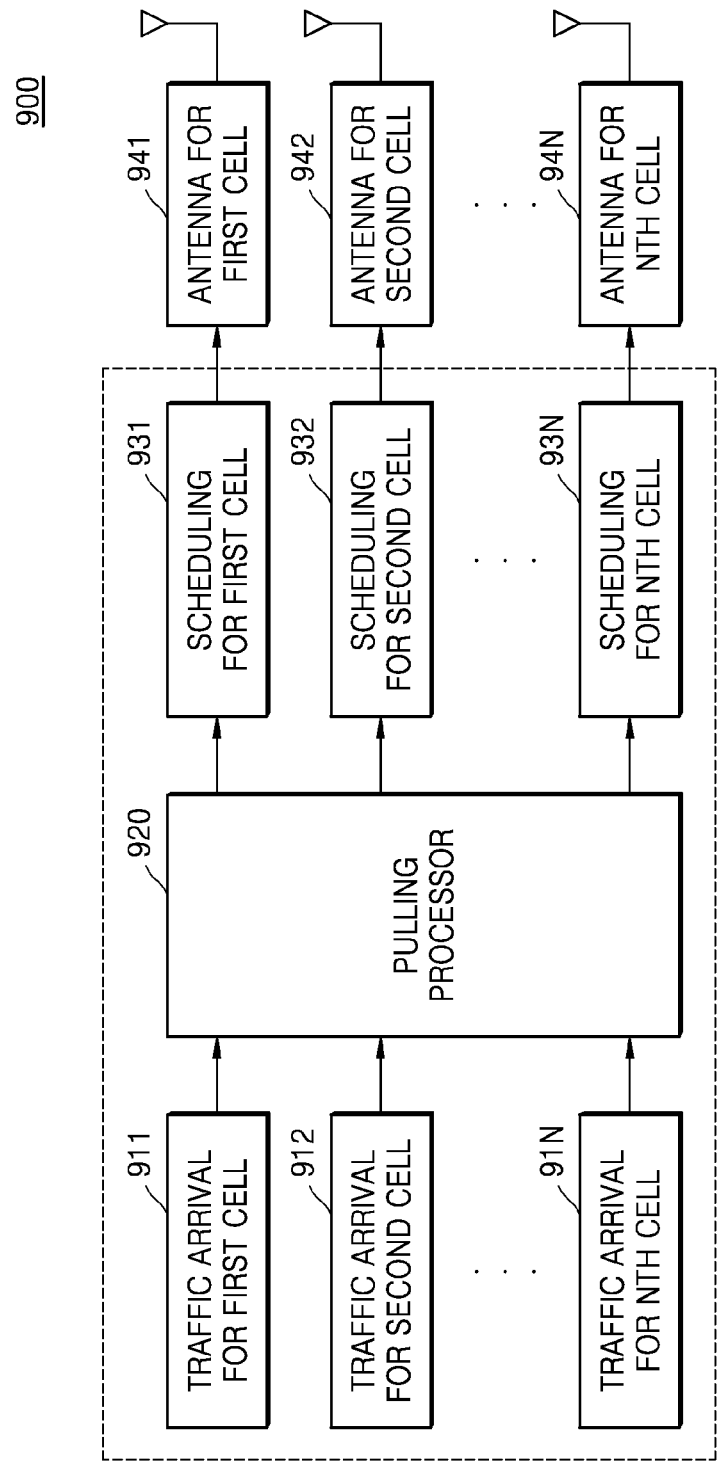
FIG. 9 is a diagram illustrating a signal processing flow in a base station, according to an embodiment.

FIG. 9 is a diagram illustrating a signal processing flow in a base station, according to an embodiment.

In FIG. 9, a pooling processor 920 may pool processing powers of a first processor, a second processor, . . . , an $N^{th}$ processor for processing signals of a first cell, a second cell, . . . , an $N^{th}$ cell and distribute processing powers to the first processor, the second processor, . . . , the $N^{th}$ processor according to a specific criterion. In an embodiment, the pooling processor 920 may distribute processing powers based on a cell-specific load, a maximum number of allocated user equipments, a throughput, PF, etc.

Thereafter, when traffic arrives for each cell as indicated by 911, 912, . . . , 91N, the pooling processor 920 may allocate the traffic to the respective processors (not shown) according to a processing power distribution result. For example, when a part of the processing power of the second processor is distributed to the first processor, traffic to be processed using the processing power of the second processor out of traffic of the first cell served by the first processor may be allocated to the second processor such that the traffic may be processed by the second processor.

The traffic processed by the respective processors (not shown) may be scheduled for each cell as indicated by 931, 932, . . . , 93N, and may be transmitted via antennas 941, 942, . . . , 94N mapped to respective cells.

According to an embodiment, wireless data traffic may be efficiently processed.

Meanwhile, the foregoing embodiment may be written as a program executable on computers, and may be implemented on a general-purpose digital computer operating the program by using a computer-readable recording medium. In addition, a structure of data used in the foregoing embodiment may be recorded on a computer-readable recording medium using various means. Moreover, the foregoing embodiment may be implemented with a recording medium including a computer-executable instruction such as a computer-executable programming module. For example, methods implemented with a software module or algorithm may be stored in a computer-readable recording medium as codes or program commands that are readable and executable by computers.

The computer-readable recording medium may be an available medium that is accessible by a computer, and includes all of a volatile medium, a non-volatile medium, a separated medium, and a non-separated medium. The computer-readable recording medium may include, but not limited to, a storage medium, for example, a magnetic storage medium such as a read-only memory (ROM), a floppy disk, a hard disk, etc., an optical reading medium such as a compact-disc (CD)-ROM, a digital versatile disc (DVD), etc. The computer-readable recording medium may also include both a computer storage medium and a communication medium.

Moreover, a plurality of computer-readable recording media may be distributed over network-connected computer systems, and data, for example, program instructions and codes, stored in the distributed recording media, may be executed by at least one computer.

While embodiments of the disclosure have been described with reference to the attached drawings, those of ordinary skill in the art to which the disclosure pertains will appreciate that the disclosure may be implemented in different detailed forms without departing from the technical spirit or essential characteristics of the disclosure. Accordingly, the aforementioned embodiments of the disclosure should be construed as being only illustrative, but should not be constructed as being restrictive from all aspects.

The invention claimed is:

1. An operation method of a base station that processes a plurality of cells, the operation method comprising:
    obtaining load information of a first cell of the plurality of cells and a second cell of the plurality of cells;
    determining based on the load information of the first cell and the second cell whether to pool processing powers of a first processor and a second processor;
    pooling a processing power of at least two processors including the first processor that processes a signal of the first cell of the plurality of cells and the second processor that processes a signal of the second cell of the plurality of cells;
    distributing the processing powers to the first processor and the second processor; and
    processing, by the first processor and the second processor, the signal of the first cell and the signal of the second cell by using the distributed processing powers,
    wherein the distributing of the processing powers to the first processor and the second processor comprises:
        distributing the processing powers to the first processor and the second processor and allocating loads, based on the load information of the first cell and the second cell, when determining to pool the processing powers of the first processor and the second processor.

2. The operation method of claim 1, wherein the distributing of the processing powers to the first processor and the second processor and the allocating of the loads comprises:
    calculating a processing complexity for each cell based on the loads allocated to the first cell and the second cell;
    determining whether a sum of processing complexities for respective cells is less than or equal to the pooled processing powers; and
    determining the loads allocated to the first cell and the second cell, when the sum of processing complexities for the respective cells is less than or equal to the pooled processing powers.

3. The operation method of claim 2, further comprising adjusting the loads allocated to the first cell and the second cell, when the sum of processing complexities for the respective cells is greater than the pooled processing powers.

4. The operation method of claim 3, wherein the adjusting of the loads allocated to the first cell and the second cell comprises adjusting the loads such that they have a least possible effect on performance of the base station.

5. The operation method of claim 1, further comprising allocating a maximum processing power of each processor to each of the first processor and the second processor, when determining not to pool the processing powers of the first processor and the second processor.

6. The operation method of claim 1, wherein the loads comprise terminals allocated to the first cell and the second cell, and
    the load information comprises a number of terminals allocated to the first cell and the second cell.

7. The operation method of claim 6, wherein the processing, by the first processor and the second processor, of the signal of the first cell and the signal of the second cell by using the distributed processing powers comprises performing, by the first processor and the second processor, scheduling with respect to the allocated terminals.

8. A base station that processes a plurality of cells, the base station comprising:
    at least two processor including a first processor configured to process a signal of a first cell of the plurality of cells and a second processor configured to process a signal of a second cell of the plurality of cells; and
    a pooling processor configured to:
        obtain load information of the first cell and the second cell;

determine based on the load information of the first cell and the second cell whether to pool processing powers of the first processor and the second processor; and distribute the processing powers to the first processor and the second processor by pooling the processing powers of the first processor and the second processor, wherein the first processor and the second processor process the signal of the first cell and the signal of the second cell by using the processing powers distributed under control of the pooling processor, and wherein the pooling processor is further configured to distribute the processing powers to the first processor and the second processor and allocating loads, based on the load information of the first cell and the second cell, when determining to pool the processing powers of the first processor and the second processor.

9. The base station of claim 8, wherein the pooling processor is further configured to calculate a processing complexity for each cell based on the loads allocated to the first cell and the second cell, determine whether a sum of processing complexities for respective cells is less than or equal to the pooled processing powers, and determine the loads allocated to the first cell and the second cell, when the sum of processing complexities for the respective cells is less than or equal to the pooled processing powers.

10. The base station of claim 9, wherein the pooling processor is further configured to adjust the loads allocated to the first cell and the second cell, when the sum of processing complexities for the respective cells is greater than the pooled processing powers.

11. The base station of claim 10, wherein the pooling processor is further configured to adjust the loads such that they have a least possible effect on performance of the base station.

12. The base station of claim 8, wherein the pooling processor is further configured to allocate a maximum processing power of each processor to each of the first processor and the second processor, when determining not to pool the processing powers of the first processor and the second processor.

13. The base station of claim 8, wherein the loads comprise terminals allocated to the first cell and the second cell, and the load information comprises a number of terminals allocated to the first cell and the second cell.

14. The base station of claim 13, wherein the first processor and the second processor perform scheduling with respect to the allocated terminals.

* * * * *